US006569495B2

(12) United States Patent
Rainer

(10) Patent No.: US 6,569,495 B2
(45) Date of Patent: May 27, 2003

(54) PROCESS FOR MAKING COMPOSITE STRUCTURES CONTAINING MICROPOROUS POLYVINYLCHLORIDE

(76) Inventor: Norman B. Rainer, 2008 Fondulac Rd., Richmond, VA (US) 23229

( * ) Notice: Subject to any disclaimer, the term of this patent is extended or adjusted under 35 U.S.C. 154(b) by 31 days.

(21) Appl. No.: 09/972,571

(22) Filed: Oct. 9, 2001

(65) Prior Publication Data

US 2002/0030300 A1 Mar. 14, 2002

Related U.S. Application Data

(63) Continuation-in-part of application No. 09/527,185, filed on Mar. 17, 2000, now Pat. No. 6,306,488.

(51) Int. Cl.[7] .................................................. B05D 3/02

(52) U.S. Cl. ........................ 427/244; 427/245; 427/341; 427/342; 427/350; 427/391; 427/392

(58) Field of Search ................................ 427/244, 245, 427/341, 342, 350, 391, 392

(56) References Cited

U.S. PATENT DOCUMENTS

| 3,674,683 A | * | 7/1972 | Rainer ......................... 210/693 |
| 3,674,722 A | * | 7/1972 | Rainer et al. .................. 521/88 |
| 3,809,669 A | * | 5/1974 | Rainer ......................... 521/145 |
| 5,002,984 A | * | 3/1991 | Rainer .......................... 524/30 |
| 5,064,540 A | * | 11/1991 | Rainer ......................... 210/688 |
| 5,162,404 A | * | 11/1992 | Rainer .......................... 524/30 |
| 5,169,883 A | * | 12/1992 | Rainer .......................... 524/30 |
| 5,595,652 A | * | 1/1997 | Rainer ......................... 210/282 |
| 5,597,850 A | * | 1/1997 | Rainer .......................... 521/29 |

FOREIGN PATENT DOCUMENTS

CS 156314 * 7/1974

* cited by examiner

*Primary Examiner*—Erma Cameron
(74) *Attorney, Agent, or Firm*—Norman B. Rainer

(57) ABSTRACT

A composite porous structure capable of absorbing organic pollutants from water is produced by preparing a dispersion of non film-forming PVC particles in a water-soluble organic liquid, impregnating a macroporous matrix such as a cellulosic sponge or paper with the dispersion, and curing the impregnated matrix by heating to achieve sintering of the PVC particles to produce a microporous substrate which is retained within the macroporous matrix.

15 Claims, No Drawings

PROCESS FOR MAKING COMPOSITE STRUCTURES CONTAINING MICROPOROUS POLYVINYLCHLORIDE

RELATED APPLICATIONS

This Application is a continuation-in-part of U.S. patent application Ser. No. 09/527,185, filed Mar. 17, 2000 now U.S. Pat. No. 6,306,488.

BACKGROUND OF THE INVENTION

1. Field of the Invention

This invention relates to composite porous structures having a matrix component of large pore size which confines a polyvinylchloride component of small pore size.

2. Description of the Prior Art

In the field of pollution control, it is often sought to remove toxic organic substances from water. The organic substances may be present in dissolved or suspended form, and may be present in large amounts, or in small amounts such as in parts per million, parts per billion, or less. Exemplary toxic organic species include: polychlorinated biphenyls, dioxins, polyaromatic hydrocarbons, nitroaromatics, pesticides, herbicides, and volatile halocarbons.

Current technology for removing such organic contaminants involves the use of activated carbon. However, the activated carbon, generally in granular form, must be confined within a vessel as a bed through which the water to be treated is caused to flow. The bed of carbon granules generally creates impedance to the water flow, requiring adequate pumping to achieve a sought flow rate. Also, suspended material in the in-going water stream may accumulate within the bed to cause even higher flow impedance. Although activated carbon functions efficiently, its total capacity for absorbed species is low, often less than 2% of the weight of the carbon. This results in the need to handle large amounts of carbon for the removal of relatively small amounts of contaminants.

Another problem in the field of pollution control is filtration for the removal of extremely fine suspended particles. Classic filtration methods employ, for example, sand bed filters and plate and frame presses. Such equipment is of large size and considerable expense, and requires careful monitoring to assure proper performance. Filters involving a porous membrane are usually employed for removing small quantities of very fine particles that may have passed through conventional filters. The membrane filters, however, are easily clogged or "blinded" when relatively little material accumulates on the upstream surface of the membrane.

The use of a microporous form of polyvinyl chloride (PVC) in filtration applications has been disclosed in U.S. Pat. No. 3,674,722. Although the microporous PVC performs well in filtration applications, it is difficult to produce useful shaped structures from the microporous PVC because of shrinkage during molding. Also, such shaped structures have been found to be brittle. When the shaped structure involves a continuous smooth upstream filtration surface, the microporous PVC filter clogs as easily as less expensive membrane filters.

It is disclosed in said U.S. Pat. No. 3,674,722 at column 3, lines 41–42 that the microporous PVC can be inserted as an impregnant into a macroporous matrix such as an open celled foam. It has been found however, that without a critical selection of the nature of the macroporous matrix and the process of incorporation of the PVC, the PVC tends to flake away from the matrix. Such is particularly the case with rigid or flexible foams or sponges comprised of polyethylene, polyurethane, polystyrene, phenolics, and silicones. In particular, it has been found that matrices comprised of hydrophilic material are best suited for retention of the microporous PVC.

It is accordingly an object of the present invention to provide a process for producing a composite porous structure capable of absorbing organic pollutants from water.

It is another object of this invention to provide a process for incorporating microporous PVC into a macroporous matrix to produce a composite porous structure as in the foregoing object.

It is a further object of the present invention to provide a process for producing a composite porous structure of the aforesaid nature capable of filtering suspended particles out of water.

It is another object of this invention to provide a low cost process for producing a composite porous structure of the aforesaid nature.

These objects and other objects and advantages of the invention will be apparent from the following description.

SUMMARY OF THE INVENTION

The above and other beneficial objects and advantages are accomplished in accordance with the present invention by a process for producing a composite porous structure capable of absorbing organic pollutants from water comprising:
a) preparing a dispersion of non film-forming PVC particles in a water-soluble organic liquid which is a non-solvent for PVC and is relatively non-volatile,
b) impregnating said dispersion into a macroporous matrix of a hydrophilic material, and
c) subjecting said impregnated matrix to an elevated temperature to achieve sintering of said particles to produce a microporous PVC substrate which is retained within said macroporous matrix.

DESCRIPTION OF THE PREFERRED EMBODIMENT

A preferred hydrophilic macroporous matrix useful in the practice of the present invention is open pore sponge produced from regenerated cellulose. Such sponge is available from the OCelO Company of Tonawanda, N.Y. The cellulosic sponge is available in fine pore and coarse pore grades, usually in the form of slab stock of various thickness. As determined by mercury intrusion porosimeter measurement, the average pore size of the coarse pore grade is about 2 mm. and the average pore size of the fine pore grade is about 1 mm. However, there is a wide range of pore sizes within either grade of sponge, and some of the pores are too large to be measured by classic porosimeter techniques. The pore structure consists of a random array of tunnels and apertures, said array having a high degree of tortuosity.

The macroporous matrix may alternatively be a paper produced from refined wood pulp cellulose by way of water dispersions which deposit a layer upon a filtering screen as in a fourdrinier process. Such paper products have an average pore size smaller than the pore size of the aforesaid cellulosic sponge products. The expression "macroporous," as employed in the characterization of the hydrophilic matrix employed in the process of the present invention is a structure which, when subjected to a standard mercury intrusion porosimetry analysis, is found to have more than 70% of its total pore volume in the form of pores having a diameter greater than 3 microns, and ranging to 360 microns, the largest pore diameter measurable by said analysis.

Other examples of macroporous matrix of hydrophilic material useful in the process of the present invention include expanded perlite and pumice. In general, the macroporous matrix is a self-supporting substrate which is a substantially continuous phase, particularly in comparison with the introduced microporous PVC substrate, which may be considered a discontinuous phase. The expression "hydrophilic", as employed herein to characterize the macroporous matrix refers to substrates which are wetted by water and further absorb water by way of a capillary action wicking effect.

The microporous PVC is produced substantially by the procedure of U.S. Pat. No. 3,674,722, said procedure involving forming a mixture of a colloidal dispersion of a latex of a non-film forming PVC with a water-soluble organic non-solvent for the polymer, and subjecting the mixture to thermal curing. A preferred non-film forming PVC latex useful in the practice of this invention is Vycar 351, produced by the B. F. Goodrich Company. Preferred water-soluble organic non-solvents include glycols of low volatility, a preferable species being glycerine. Suitable low volatility non-solvents are liquids having a boiling point at atmosphere pressure of greater than 220 degrees F.

The latex may be mixed with the non-solvent liquid by conventional techniques, low shear methods being preferable. It is preferred to add the non-solvent liquid slowly to the latex, rather than to add the latex to the non-solvent liquid. From 0.4 to 5 parts, by weight, of the non-solvent are preferably employed for each part of polymer contained in the latex. The mixture of latex and non-solvent liquid is essentially a colloidal dispersion of the polymer particles in the non-solvent liquid containing water derived from the latex. Mixtures containing the lower ranges of polymer content produce microporous PVC having higher pore volume, larger average pore size, and lower structural strength, by comparison with microporous PVC substrates produced from dispersions of higher polymer content.

To produce the composite porous structures of the present invention, the latex/non-solvent mixture dispersion is added to the hydrophilic, preferably cellulosic matrix of the aforesaid nature in dry form, whereby the matrix absorbs the mixture. The expression "dry" as employed herein to describe the cellulosic matrix is intended to denote a moisture content of less than 13%. The amount of the mixture added is such as to be just short of producing gravity-induced run-off of the mixture from the matrix. To facilitate achievement of the proper saturation of the cellulosic sponge or paper matrix, the impregnated matrix may be run through rollers to remove excess dispersion mixture. The initially employed cellulosic matrix may be in the form of sheets which may subsequently be cut to smaller size to produce shreds or cubes.

The impregnated matrix is then subjected to heat treatment at temperatures in the range of 220 degrees F to 300 degrees F for periods of from about 150 to 10 minutes, respectively. The effect of the heat treatment is to cause the dispersed polymer particles to cohere or sinter together, thereby forming a microporous substrate structure within the pores of the cellulosic matrix. Greater degrees of sintering, produced by the more severe heating conditions, provide structures having reduced pore volume, smaller average pore size, and greater strength. If the heat treatment is insufficient, the microporous PVC will have too little strength to be retained within the cellulosic matrix.

In order to produce composite porous structures that can effectively absorb significant amounts of organics from water while retaining acceptable porosity and retention of the microporous PVC substrate, it has been found that the weight ratio of PVC/cellulosic matrix should range from 0.5/1 for cellulosic papers to 5/1 for cellulosic sponge. Lower weight ratios result in composite porous structures having little absorptive capacity for organics. Higher weight ratios result in composite structures of reduced porosity with attendant diminished ability to allow passage of water requiring remediation. However, it has been desirably found that composite porous structures of this invention based upon cellulosic sponge, and having PVC/cellulose ratios in the range of 2 to 5, exhibit wet compressive strengths 10 to 200 times greater, respectively, than the starting cellulosic sponge.

The microporous PVC produced by the present process is a sintered substrate comprised of a multitudinous random array of interconnecting capillaries or interstices whose walls are composed of cohered particles of polymer which, under electron microscopic examination are seen to substantially retain their individual identities. The effect of the sintering step, therefore, is to cause the polymer particles to interadhere at their points of contact, as opposed to causing complete melting of the particles to a molten form with loss of particle identity and consequent reduced surface area. The average diameter of the pores or interstices may range from about 0.2 micron to 20 microns. The pore volume of the microporous PVC substrate may range from 0.4 cc/gram for strongly sintered structures useful in bacterial filtration to 4.5 cc/gram for lightly sintered structures.

The surface area of the microporous PVC may range from about 0.5 square meters/gram to about 12 square meters/gram. It may be noted in this connection that the total theoretical surface area of a polymer latex, namely, non-touching spheres of polyvinyl chloride of 0.2 to 0.8 micron diameter, is 15 square meters/gram. The microporous PVC substrate produced by the process of this invention, therefore, retains from about 5 percent to about 55 percent of the surface area of the starting material. This is essentially a measure of the degree of coherence of the sintered microporous substrate. The relatively large surface areas are a result of the retention of individual particle identity referred to hereinabove. The physical characteristics of the microporous PVC substrate can be best measured by producing the substrate as a molded object in the absence of the cellulosic matrix but under the same conditions of dispersion dilution and thermal curing as would be employed in an intended composite sponge structure.

It is to be noted that the aforesaid procedure for producing the composite sponge of this invention differs from the procedure in U.S. Pat. No. 3,674,722 in that the water component of the dispersion mixture is not removed in a separate dehydration step prior to thermal curing. It is felt that the dry cellulose of the matrix selectively removes the water from the dispersion mixture, thereby obviating the otherwise necessary dehydration of the mixture. This is an unexpectedly advantageous feature of employing a cellulosic matrix such as a sponge or paper as the macropore component instead of other, non-water absorbing macroporous substrates. Hydrophilic macropore matrices such as perlite and pumice may provide a water-absorbing effect similar to cellulosic matrices if used in bone-dry form.

The microporous PVC substrate may contain certain additives via incorporation in the dispersion prior to or subsequent to sintering. Such additives include fine clays; other polymers in latex or powder form such as polyvinyl acetate; polystyrene, and other addition and condensation polymers; activated charcoal; graphite; carbon black; powdered metals; catalysts; pigments; stabilizers; plasticizers; bacteriostats; flavorants; odorants; functional water-insoluble organic compounds; and other species. A particularly preferred additive is sub-micron sized positively charged particles, such as "Alon" alumina aerogel, a product of the Cabot Corporation. Electrically conductive graphite is also of interest as a filler. The additive, when employed, usually will be present in an amount from about 0.3 percent to about 20 percent by weight of the PVC. Certain additives may be employed which, in conjunction with the fine pore structure of the PVC substrate cause the composite sponge structure to be useful in retaining microbial organisms useful in the bioremediation of polluted water. When iron powder, having an average particle size below 200 microns, is incorporated into the microporous PVC substrate, the resultant composite sponge structure is eminently suited for the reductive degradation of trichloroethylene and other volatile halocarbons that may exist in polluted water.

The organic liquid may be removed from the thermally cured composite structure by washing with water or by evaporation at reduced pressure, thereby facilitating re-use of said liquid. Alternatively, however, the cured product may be sold and used with the contained liquid. With initial use of the composite porous structure in a water-treating operation, said liquid will be removed. Liquids such as glycerine are biodegradable and environmentally benign.

Although the utility of the composite porous structure of this invention has been described with respect to water filtration and treatment, other uses for the structure exist as, for example, air filtration, sound absorption and thermal insulation.

The following examples present illustrative but non-limiting embodiments of the present invention. All parts and percentages are by weight unless otherwise noted.

EXAMPLE 1

A washed, dried sheet of OCelO cellulosic sponge of fine pore grade and ½" sheet thickness was cut into ½" cubes.

A dispersion mixture was made by slowly adding with rapid stirring 90 grams of anhydrous glycerine to 150 grams of Vycar 351 (B. F. Goodrich) having a 57.9% content of PVC. The resultant dispersion was added in its entirety to 34.7 grams of the aforesaid cellulose sponge cubes. The dispersion became completely absorbed by the cubes, without run-off. Some mixing and kneading of the cubes was done to achieve uniform distribution of the dispersion within the cubes.

The impregnated cubes were placed in a tray and entered into an oven initially at 212 degrees F. After 30 minutes, the oven temperature was elevated to 260 degrees F. The tray was removed after 40 minutes exposure to the 260 degree temperature. The cubes were washed with water to remove glycerine, then dried. The weight add-on of PVC was found to be 341%, or a weight ratio of PVC to cellulose of 3.41/1. The outer envelope or geometrical volume of some of the dry composite porous structure cubes was accurately measured in conjunction with recordation of the corresponding weight of each cube. By assuming specific gravities of 1.4 for both cellulose and PVC, it is possible to calculate the total pore volume of the cubes, and such calculated pore volume is 88%. The expression "total pore volume" is intended to denote the empty space volume of the structure which may be occupied by air or other fluid. By way of comparison, the similarly calculated total pore volume of the starting cellulosic sponge is 96%.

The cubes were placed in a water treatment column of 2" I.D. A test solution was prepared containing 5 ppm. each of a number of toxic organic compounds. The test solution was passed through the column of cubes at a rate so as to provide 10 minutes of residence time with the bed of cubes. The treated effluent water was analyzed for said compounds. The results obtained are shown in Table 1.

TABLE 1

| Compound | % reduction |
|---|---|
| Methyl t-butyl ether | 37 |
| polynuclear aromatic hydrocarbons | 56 |
| polychlorinated biphenyls | 63 |
| trichlorethylene | 81 |
| pentachlorophenol | 49 |
| chlordane | 76 |

EXAMPLE 2

One pound of the composite rigid sponge structure cubes prepared in Example 1 was added to fifty gallons of river sediment sludge retrieved from the Hudson River in New York, and containing 29 pounds (dry weight basis) of sediment contaminated with 28 ppm of polychlorinated biphenyls (PCB).

The mixture was tumbled at 3 rpm in a concrete-type mixer for 24 hours at an ambient temperature of 78 degrees F. The mixture was then poured through a ¼" mesh grate, which retained the sponge cubes and passed the sediment slurry. Analysis of the sediment material treated in such manner revealed a 72% reduction in PCB.

EXAMPLE 3

An OCelO sheet of Example 1 weighing 25 grams was treated in sheet form with a dispersion mixture comprised of 89 grams of glycerine and 176 grams of Vycar 351. The sheet completely absorbed the dispersion mixture, and was placed upon a rotating holder in an oven initially set at 212 degrees F. The rotation of the sheet prevented gravitational migration of the dispersion mixture out of the sheet and promoted uniform distribution of the dispersion mixture throughout the sheet.

The temperature was elevated to 260 degrees F, and maintained there for 60 minutes until curing of the dispersion mixture was complete. The sheet was removed from the oven, thoroughly washed with water to remove the glycerine, and dried. The resultant composite rigid sponge product, in sheet form, contains a PVC add-on of 407%, namely a ratio of PVC to cellulose of 4.07.

A circular specimen of 2 inch diameter was cut from the PVC-containing sheet and secured within a filter-holding device. An aqueous colloidal test dispersion containing particles of 0.2 to 0.8 micron diameter was prepared by diluting a sample of the dispersion mixture employed in producing the composite sponge structure of this example. The colloidal dispersion was disposed in a tube directly over the filtration specimen, and the dispersion was allowed to flow through the filtration specimen under gravity force alone. It was found that the specimen was capable of filtering a considerable quantity of the colloidal dispersion without clogging or "blinding."

Another specimen was cut from the PVC-containing sheet of this example and subjected to a compression test in wet form. In a comparison test, a piece of the starting OCelO sponge was also tested in wet form. It was found that the force to achieve 50% compression of the OCelO sponge is 0.1 pounds/square centimeter, whereas the force to achieve 50% compression of the composite rigid sponge of this example is 20.0 pounds/square centimeter. This represents a 200-fold increase in compressive strength.

Of further interest is the fact that the starting OCelO sponge will swell about 30% in volume in going from a dry state to a wet state, whereas the composite rigid sponge structure of this example undergoes less than 20% swelling in going from dry to wet states.

EXAMPLE 4

Di-2-ethylhexyldithiophosphoric acid (DEHDTPA) was dispersed in water with the aid of a non-ionic dispersing agent to form a 1% dispersion. Said dispersion was employed to treat the cubes of Example 1 disposed to a height of 30 inches in a column of three inch inside diameter. The cubes absorbed the DEHDTPA from the dispersion, causing the cubes to contain 8.4% by weight of DEHDTPA. The DEHDTPA, a known complexing agent for heavy metals, is thereby solvated or molecularly absorbed within the PVC substrate.

The cubes containing the DEHDTPA, and still confined within the column, were then treated with an aqueous solution saturated with NaCl and containing 5 ppm each of $Cu^{++}$, $Cd^{++}$ and $Pb^{++}$ as the chlorides. The solution was caused to flow downwardly at a rate such as to permit 10 minutes of residence time within the column. The uppermost cubes in the column produced a sharply defined darkly colored absorption zone, and the effluent solution was found to have no detectable amounts of $Cu^{++}$, $Cd^{++}$ and $Pb^{++}$. Such results demonstrate the usefulness of the composite sponge structure of the present invention as a selective absorbent for trace levels of toxic heavy metals in water.

EXAMPLE 5

A specimen of blotter-type paper having a basis weight of 1.8 ounces per square foot was impregnated under vacuum conditions with the dispersion mixture employed in Example 1. The resultant impregnated specimen was heat treated in an oven at 255 degrees F for 65 minutes. Following washing with water and drying, the resultant product was found to have considerably greater stiffness than the original paper specimen.

A circular piece of 2 inch diameter was cut from the treated, dried specimen and subjected to the same filtration test described in Example 3, except using a pumped pressure of 10 psi instead of gravity force to drive the test dispersion through the specimen. A considerable amount of said test dispersion was effectively filtered before clogging of the specimen became significant, as evidenced by diminution of flow rate.

EXAMPLE 6

Some newspapers were shredded on a commercially available shredding machine to produce elongated shreds of newspaper of about ¼" width. The shredded material was randomized, then sprayed to saturation with a dispersion having been produced by mixing 4.8 pounds of anhydrous glycerine with 8.0 pounds of Vycar 351 PVC latex having 58% solids content. Excess dispersion was allowed to drain off, and the randomized mass of impregnated shreds was compacted to a ¾" thick layer in a teflon-coated aluminum tray.

The tray containing the compacted mass was placed in an oven at 275° F. for 100 minutes. The mass was then washed with water while still in the tray, then removed as an integral self-supporting panel which is reasonable rigid, even in water-wet state. The panel structure is produced by the interbonding of contacting shreds at their cross-over sites, each shred being a porous composite structure of this invention. Upon drying, the add-on weight of PVC was found to be 1.01×.

For testing purposes, the panel was immersed in a large vessel containing water. Trichloroethylene (TCE), a pervasive pollutant, was added to the vessel, and the vessel was sealed and subjected to shaking action for one hour. The panel was then removed and analyzed for TCE content. It was found that the panel had absorbed an amount of TCE equal to 109% of the dry weight of the panel.

Such capabilities enable to the panel to be well suited for the in-situ removal of pollutants from ground water. In particular, the panel would be emplaced within a trench that intercepts ground water, and would be removed after a period of days or weeks with its captured organic pollutant.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A process for producing a composite porous structure capable of absorbing organic pollutants from water comprising:
    a) preparing a dispersion of non film-forming PVC particles in a water-soluble organic liquid which is a non-solvent for PVC and is relatively non-volatile,
    b) impregnating said dispersion into a macroporous matrix of a hydrophilic material, and
    c) subjecting said impregnated matrix to thermal treatment to achieve sintering of said particles to produce a microporous PVC substrate retained within said macroporous matrix.

2. The process of claim 1 wherein said organic liquid is glycerine.

3. The process of claim 1 wherein said hydrophilic material is cellulosic.

4. The process of claim 3 wherein said cellulosic hydrophilic material is an open-celled sponge comprised of regenerated cellulose.

5. The process of claim 3 wherein said cellulosic hydrophilic material is paper.

6. The process of claim 1 which produces said composite porous structure having an amount of PVC equal to between 1 and 5 times the weight of said macroporous matrix.

7. The process of claim 1 wherein said organic liquid has a boiling point greater than 220 degrees F at atmospheric pressure.

8. The process of claim 1 wherein said macroporous matrix has more than 70% of its total pore volume in the form of pores having a diameter greater than 3 microns.

9. The process of claim 1 further including the step of removing said organic liquid from said composite porous structure.

10. The process of claim 1 wherein the ratio of weight of non-solvent to weight of PVC in said dispersion is between 0.4 and 5.

11. The process of claim 9 wherein said organic liquid is removed by way of extraction with water.

12. The process of claim 9 wherein said organic liquid is removed by way of evaporation under reduced pressure.

13. The process of claim 1 wherein said thermal treatment is conducted at temperatures in the range of 220° F. to 300° F.

14. The process of claim 13 wherein said thermal treatment is conducted for a duration of 10 to 150 minutes.

15. The process of claim 1 wherein the produced microporous PVC substrate has a surface area between 0.5 and 12 square meters per gram.

* * * * *